United States Patent [19]

Winkler et al.

[11] Patent Number: 5,141,527
[45] Date of Patent: Aug. 25, 1992

[54] CERAMIC SINTERED BODY AND METHOD OF PRODUCING IT

[75] Inventors: Herwig Winkler; Peter Janz, both of Klagenfurt; Georg Gottschamel, Treibach, all of Austria

[73] Assignee: Treibacher Chemische Werke Aktiengesellschaft, Treibach, Austria

[21] Appl. No.: 498,278

[22] Filed: Mar. 23, 1990

[30] Foreign Application Priority Data

Apr. 14, 1989 [AT] Austria .................................. 895/89

[51] Int. Cl.⁵ .............................................. B24D 11/00
[52] U.S. Cl. ........................................ 51/293; 51/298; 51/307; 51/308; 51/309
[58] Field of Search ................. 51/293, 298, 307, 308, 51/309

[56] References Cited

U.S. PATENT DOCUMENTS

| | | | |
|---|---|---|---|
| 1,910,031 | 5/1933 | Milligan | 51/308 |
| 3,089,764 | 5/1963 | Gorman | 51/308 |
| 3,377,176 | 4/1968 | Wolkodoff et al. | 501/95 |
| 3,913,281 | 10/1975 | Jones | 51/308 |
| 4,007,020 | 2/1977 | Church et al. | 51/295 |
| 4,314,827 | 2/1982 | Leitheiser et al. | 51/298 |
| 4,541,842 | 9/1985 | Rostoker | 51/298 |
| 4,741,743 | 5/1988 | Narayanan et al. | 51/309 |
| 4,786,292 | 11/1988 | Janz et al. | 51/293 |
| 4,799,938 | 1/1989 | Janz et al. | 51/293 |
| 4,800,685 | 1/1989 | Haynes et al. | 51/298 |
| 4,881,951 | 11/1989 | Wood et al. | 51/309 |
| 4,883,501 | 11/1989 | Haynes, Jr. | 51/309 |
| 4,898,597 | 2/1990 | Hay et al. | 51/298 |
| 4,964,883 | 10/1990 | Morris et al. | 51/293 |
| 4,997,461 | 3/1991 | Matheny et al. | 51/293 |

FOREIGN PATENT DOCUMENTS 0293163 5/1988 European Pat. Off. .

Primary Examiner—William R. Dixon, Jr.
Assistant Examiner—Willie J. Thompson
Attorney, Agent, or Firm—Kurt Kelman

[57] ABSTRACT

Ceramic sintered body, in particular abrasive grain, based on $\alpha$-$Al_2O_3$, said body being arranged in such a manner that improved abrasive results are achieved, said body being bound into a structure by means of a glass-like ceramic binder and showing a drop in hardness from its center to its edge of less than 1800 N/mm², preferably less than 1000 N/mm², and, in particular, less than 500 N/mm².

15 Claims, No Drawings

CERAMIC SINTERED BODY AND METHOD OF PRODUCING IT

TECHNICAL FIELD

The invention refers to a ceramic, sintered body, in particular abrasive grain based on $\alpha$-$Al_2O_3$.

The production of formed bodies based on $\alpha$-alumina by sintering is known. The forming may take place by drying by pressing, extruding ductile masses, slip casting or drying of a thickened suspension etc. Crushing of the moulded masses before or after the sintering leads to sharp-edged grains which may also be used as abrasive grains.

Oxides or hydroxides of aluminum are mostly used as basic materials for sintered bodies based on $\alpha$-$Al_2O_3$.

BACKGROUND ART

The U.S. Pat. No. 3 377 176 discloses the production of a ceramic formed body made of $Al_2O_3$ with a minute admixture of foreign oxides, whereby alum earth, the basic material, is pressed, said alumia having a grain size of $<1$ $\mu m$.

The U.S. Pat. No. 4 786 292 discloses the production of a sintered abrasive grain, said grain being derived from a mixture of alumina and highly dispersable $\alpha$-Al-oxide monohydrate, whereby admixtures of oxides of various metals up to 1 weight percent are stated therein.

The European Patent Application EP-A 0 304 616 refers to surface treated abrasive grain based on alumina. The treatment of the surface may take place, amongst others, by means of highly disperse $Al_2O_3$. The sole object of such treatment is, however, the achievement of high surface conductivity by applying hygroscopic and hydrophile layers. This publication does not disclose any items taking influence on the hardness.

The European Patent Application EP-A 0 263 810 refers to the production of a microcrystalline abrasive grain based on $\alpha$-$Al_2O_3$. The basic material used this case is highly dispersable $\alpha$-Al-oxide monohydrate.

The European Patent Application EP-A 0 293 163 describes the production of an abrasive grain from an Al-oxide-sol, said grain, after having been calcined, being subjected to impregnation by means of a saline solution for improving its properties. The salts used in said saline solution are metal compounds which, during the subsequent heating, transform into metal oxides and react with the matrix.

The U.S. Pat. No. 4 007 020 discloses a method in order to bring about higher hardness in a porous, ceramic body. This takes place mainly by impregnating the porous structure with a solution of an anorganic chromium compound, said compound transforming into an oxide during heating. The impregnation is repeated several times, whereby, as a last step, said impregnation may be performed with phosphoric acid.

All above mentioned ceramic bodies, when used as abrasive grains in an abrasive disc, show high reactivity with the glass-like, ceramic binding material which is used in the production of discs. The surface of the grains reacts with the binder during the firing and said surface is "softened". Thus a decrease in the hardness on the surface of the grains occurs and, consequently, a decrease in the abrasive performance.

Disclosure of Invention

It is the object of the present invention to create an abrasive grain, the properties of which are not essentially impaired when said grain is bound by means of a ceramic binder.

A further object of the invention is to prevent a decrease in hardness on the surface of said grain and thus improved abrasive properties.

These tasks are solved in that the body, said body being bound into a structure by means of a glass-like, ceramic binder, shows a decrease in hardness from its center to its edge of less than 1800 $N/mm^2$, preferably less than 1000 $N/mm^2$, and in particular less than 500 $N/mm^2$. Specifically, the decrease in hardness from the center of the grain to its edge was determined as being particularly adverse for the abrasive properties. The ceramic bodies according to the invention are capable of achieving extremely high abrasive results. Grain sizes between 0.05 and 1.5 mm and, in particular, between 0.2 and 1 mm have proved to be especially preferable.

The invention further refers to the use of a ceramic, sintered body for the production of abrasive discs and similar items.

In accordance with the invention, the grains are bound by a ceramic, glass-like binder. Abrasive discs produced in such a manner achieve the highest abrasive results.

A further aspect of the invention is a method for producing a ceramic body, said body being based on $\alpha$-$Al_2O_3$, by means of sintering. This method is characterized in that the presintered body is deaerated in a vacuum and said body is subsequently treated with an aqueous suspension, whereby the grain sizes of the solid matter in said suspension are less than 0.5 $\mu m$, preferably less than 0.05 $\mu m$, and even more preferably less than 0.02 $\mu m$, whereinafter excessive suspension is taken away and the bodies treated in such a manner are dried and sintered again.

Quite surprisingly it was noticed that by treating near densely sintered bodies with a suspension of highly dispersable $\alpha$-Al-oxide monohydrate, the decrease in the hardness on the grain surface, which was to be expected after the burning with the binder, was considerably reduced.

The known sintered, ceramic formed bodies comprise a more or less considerable residual porosity. When such grains are used in ceramic abrasive discs, said residual porosity has a negative effect on the abrasive properties. The glass binder comprises oxides with a low melting point and said oxides, during burning of the discs, enter into a liquid phase and penetrate the pores of the abrasive grain. This leads to a considerable chemical attack against the aluminum oxide located in the outer layers and along the grain boundaries. The consequence thereof is a strong decrease in the hardness of the grain surfaces which engage in the abrasive process.

The infiltration of the pores by the suspension, said suspension hardening in the pores during drying and sintering, brings about the effect that the liquid phase of the ceramic binder is no longer in the position to penetrate the structure of the grain and "soften" it.

In principle the infiltration may be performed in any sintered body still having open pores.

Any suspension is suitable the viscosity of which is low enough to penetrate pores whose sizes are between 0.5 and 1 $\mu m$ and where said suspension has solid matter consisting of $\alpha$-Al oxide monohydrate and/or Al-oxide and/or Al-hydroxide. The grain size of the suspended particles should be less than 0.05 $\mu m$ in order to guarantee complete filling of the pores. The addition of acid to the suspension has proved to be advantageous. The content of solid matter in the suspension lies between 5-30 weight percent, preferably between 10 and 25 weight percent.

The infiltration itself can be performed by immersing the grains into the suspension and, subsequently, by filtering through a wide-meshed screen. During this process the grains are preferably deaerated, so that the pores can be well filled with suspension.

After getting rid of excessive suspension, the grains are dried. The increase in weight, depending on the porosity and grain size, may reach up to 15 weight percent. The dried product may also be carefully comminuted, in order to separate grains which are stuck together due to suspension remnants. Subsequently the final sintering of the filtered and dried grains takes place at temperatures between 1100° C. and 1400° C.

Like abrasive grains, said surface treatment may also be applied to sintered formed parts, e.g. cutting discs or expendable parts for improving the surface.

EXAMPLES

The following examples are intended to outline the invention without, however, limiting it in any way.

EXAMPLE 1

An abrasive grain, said grain having a grain size of 0.25 mm, having been produced in accordance with the U.S. Pat. No. 4 786 292, and having been sintered at 1500° C. to a theoretical density of 90 percent, was deaerated in an air-tight pot. Subsequently layers of a hydrous nitric acid suspension, said suspension containing 10 weight percent alum earth and 10 weight percent of dispersable α-Al-oxide monohydrate are placed on the grains under a vacuum and aired. After approx. 30 minutes the suspension is poured through a screen and the grains are dried at 80° C. in a dry box. The weight increase was 6 percent after the drying. The dried grains were then sintered at 1400° C. for one hour.

EXAMPLE 2

An abrasive grain produced in accordance with the European Application 0 263 810 (grain size 1 mm) is sintered at 1300° C. to 95 percent theoretical density. The grains were deaerated in a tightly closed vessel and layers of a suspension, said suspension containing 20 weight percent α-Al-oxide monohydrate and 1 weight percent nitric acid (concentrated;. were placed on to the grains in a vacuum. The grain sizes of the suspended particles were less than 0.02 μm. The suspension was poured through a screen after 30 minutes and the grain was then dried in a dry box at 80° C. The weight increase amounted to 1.5 percent. Final sintering of the grains took place at 1300° C. for two hours.

EXAMPLE 3

An abrasive grain produced in accordance with European Application 0 263 810, said grain having a grain size of 0.4 mm, was sintered at 1200° C. to a theoretical density of 88 percent. The grains were subsequently deaerated in a tightly closed vessel and layers of a suspension, said suspension containing 20 weight percent α-Al-oxide monohydrate and 1 weight percent nitric acid (conc.) were placed on to the grains in a vacuum. The grain sizes of the suspended particles were less than 0.02 μm. After 30 minutes the suspension was poured through a screen and the grain was then dried in a dry box at 80° C. The weight increase amounted to 5 percent. Final sintering took place at 1300° C. for 1.5 hours.

The table below shows the drop in hardness of the bound bodies from the center to the edge of the grains in, $N/mm^2$ and the abrasive performance (i.e. ratio of amount of abrased material to wear of discs) of grains in ceramically bound abrasive discs, said grains having been treated in accordance with the invention.

| Material | Drop in hardn. $N/mm^2$ | Schleifleistung (referring to material without treatment) |
|---|---|---|
| U.S. Pat. No. 4,786,292 | 2500 | 100 |
| Example 1 | 500 | 140 |
| EU-App. 0 263 810 | 2000 | 100 |
| Example 2 | 1500 | 120 |
| Example 3 | 300 | 190 |

We claim:

1. Method for producing a ceramic body based on α-$Al_2O_3$ by a sintering process, wherein the ceramic body is presintered then deaerated in a vacuum and said body is subsequently treated with an aqueous suspension said suspension having solid matter with a grain size of less than 0.5 μm, whereinafter the suspension is taken away and the bodies thus treated are dried and sintered again.

2. Method for producing a ceramic body based on α-$Al_2O_3$ by a sintering process, wherein the presintered ceramic body is deaerated in a vacuum and said body is subsequently treated with an aqueous suspension said suspension having solid matter with a grain size of less than 0.05 μm, whereinafter the suspension is taken away and the bodies thus treated are dried and sintered.

3. Method for producing a ceramic body based on α-$Al_2O_3$ by a sintering process, wherein the presintered ceramic bodies deaerated in a vacuum and said body is subsequently treated with an aqueous suspension said suspension having solid matter with a grain size of less than 0.02 μm, whereinafter the suspension is taken away and the bodies thus treated are dried and sintered.

4. Method of claim 1 wherein the solid matter of the suspension consists of an Al-containing compound selected from the group consisting of highly disperse α-Al-oxide monohydrate, $Al_2O_3$ and Al-hydroxide.

5. Method of claim 2 wherein the solid matter of the suspension consists of an Al-containing compound selected from the group consisting of highly disperse α-Al-oxide monohydrate, $Al_2O_3$ and Al-hydroxide.

6. Method of claim 3 wherein the solid matter of the suspension consists of an Al-containing compound selected from the group consisting of highly disperse α-Al-oxide monohydrate, $Al_2O_3$ and Al-hydroxide.

7. Method of claim 1 wherein the solid matter of the suspension is 5-30 weight percent (calculated as $Al_2O_3$).

8. Method of claim 1 wherein the solid matter of the suspension is 10-25 weight percent (calculated as $Al_2O_3$).

9. Method of claim 1 wherein an addition of an acid of up to 10 weight percent is made to the solid matter suspension.

10. Method in accordance with claim 9 wherein the added acid is selected from the group consisting of nitric acid, hydrochloric acid and acetic acid.

11. Method of claim 1 wherein there is a weight increase, due to the treatment with solid matter suspension, amounts to 0.5 to 10 percent.

12. Method of claim 1 wherein there is a weight increase, due to the treatment with solid matter suspension, amounts to 1 to 6 percent.

13. Method of claim 1 wherein the sintering of the bodies treated with the solid matter suspension takes place at temperatures between 1100° C. and 1400° C. during a period ranging from 15 minutes up to 4 hours.

14. Method of claim 4 wherein the sintering of the bodies treated with the solid matter suspension takes place at temperatures between 1100° C. and 1400° C. during a period ranging from 15 minutes up to 4 hours.

15. Method of claim 7 wherein the sintering of the bodies treated with the solid matter suspension takes place at temperatures between 1100° C. and 1400° C. during a period ranging from 15 minutes up to 4 hours.

* * * * *